United States Patent [19]

McCombs, Jr.

[11] 4,245,462

[45] Jan. 20, 1981

[54] STARTING SYSTEM FOR A TURBINE ENGINE

[75] Inventor: Howard L. McCombs, Jr., South Bend, Ind.

[73] Assignee: The Bendix Corporation, Southfield, Mich.

[21] Appl. No.: 964,770

[22] Filed: Nov. 29, 1978

[51] Int. Cl.³ .......................... F02C 7/262; F02C 9/28
[52] U.S. Cl. .......................... 60/39.14 R; 60/39.28 R
[58] Field of Search .................... 60/39.14 R, 39.28

[56] References Cited

U.S. PATENT DOCUMENTS

| 2,892,309 | 6/1959 | Sipin | 60/39.14 R |
| 4,010,605 | 3/1977 | Uram | 60/39.14 R |
| 4,044,554 | 8/1977 | West | 60/39.14 R |

Primary Examiner—Louis J. Casaregola

Attorney, Agent, or Firm—Leo H. McCormick, Jr.; Ken C. Decker

[57] ABSTRACT

A timer mechanism for controlling the scheduling of the flow of fuel through a metering valve to a turbine engine in response to rotation of a scheduling cam by the movement of a power lever from a cut-off position. A temperature compensating apparatus connected to the turbine engine modifies the output of the scheduling cam to compensate for the temperature of the air supplied to the turbine engine and a pressure responsive apparatus connected to the timer mechanism further modifies the output of the scheduling cam to compensate for the atmospheric pressure of the surrounding environment to provide the optimum fuel flow for starting the turbine engine under varied operational conditions.

43 Claims, 4 Drawing Figures

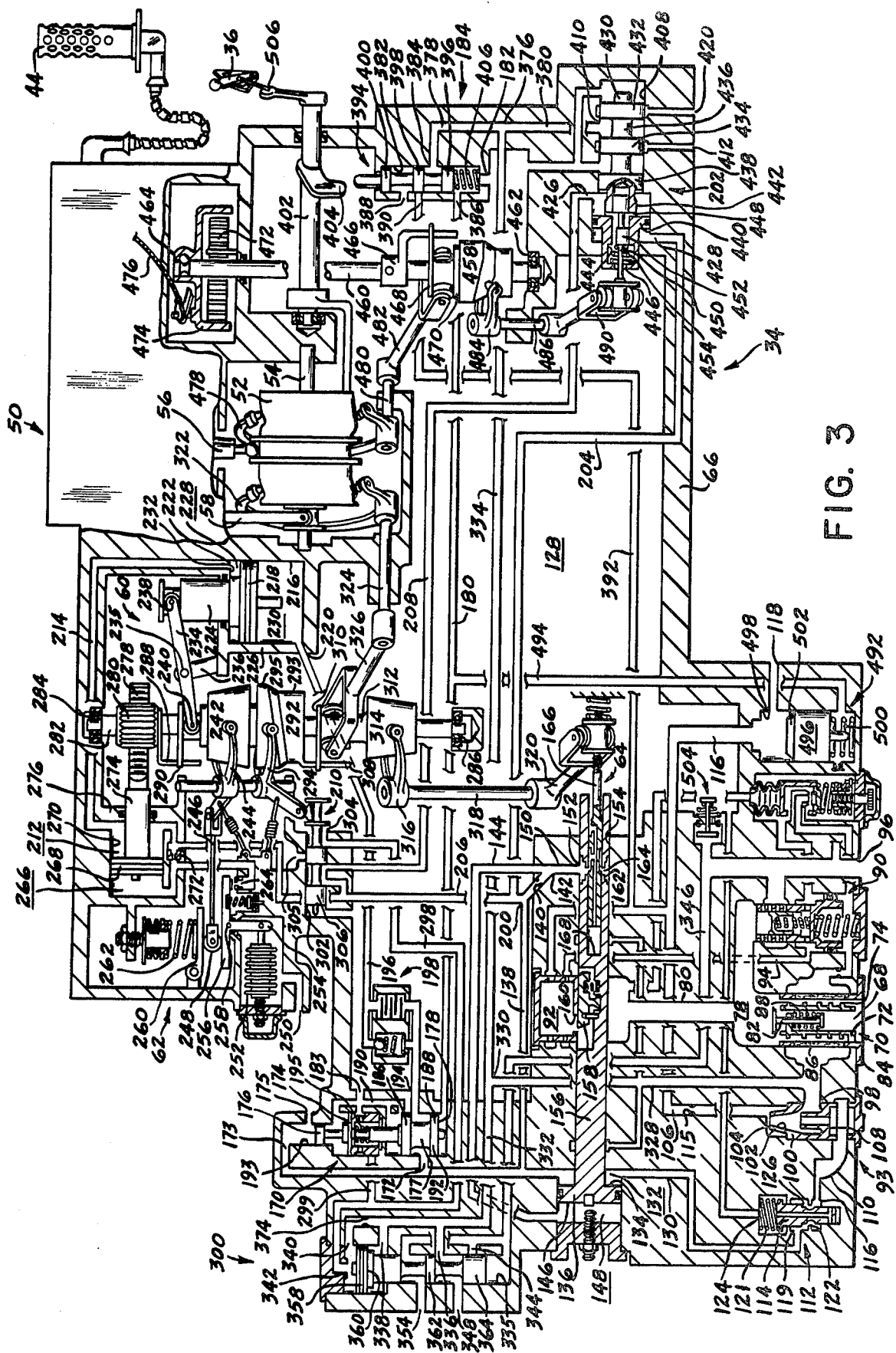

STARTING SYSTEM FOR A TURBINE ENGINE

BACKGROUND OF THE INVENTION

Every turbine engine has an optimum fuel to air ratio for starting and operating the turbine engine. It is common practice to use fuel scheduling cams for controlling the fuel flow to the turbine engine.

In order to start such turbine engines an operator moves a power lever from a cut-off position, where fuel communication to the turbine engine is interrupted, to a start position. As the compressor of the turbine engine is rotated, a feedback signal is supplied to a metering valve which schedules a fuel to the engine at a predetermined fuel to air ratio corresponding to engine speed to start the engine. This type of feedback control is adequate when the turbine engine is operating at or substantially near atmospheric pressure and sea level.

Because of the power which such turbine engines produce they are often used on aircraft which require substantially instantaneous maneuverability. Unfortunately, such aircraft are often required to fly at high altitudes and under conditions wherein smoke or other contaminates are often encountered. If the smoke or contaminates reduce the percentage of oxygen in the air supplied to the compressor sufficiently, the fuel to air ratio is upset and complete combustion of the fuel supplied to the turbine does not occur which can result in a "flame out". Thereafter, it is imperative that the fuel supplied to the turbine be interrupted to prevent damaging the turbine engine. Thus, the pilot must move the power lever to the cut-off off position to terminate the flow of fuel to the turbine. Thereafter, the pilot must restart the turbine engine while the aircraft is in the air. To restart the turbine engine, the pilot moves the power lever to an idle position. With the power lever in the idle position a starter rotates the air compressor. As the compressor rotates, a feedback apparatus controls the scheduling of the fuel to the turbine at a fixed fuel to air ratio corresponding to sea level. Unfortunately, at such an altitude, the time required to start the turbine is different than at sea level. Thus, restarting of the engine can often result in a delay in the power operation of the aircraft.

SUMMARY OF THE INVENTION

I have devised a fuel control for a turbine engine having a timer mechanism for controlling the scheduling of fuel to start a turbine engine in response to movement of a power lever by an operator from a cut-off off position to an idle position. Movement of the power lever which is connected to a fuel scheduling cam that is modified by the temperature of the air supplied to the compressor of the turbine engine establishes a fuel flow request that is relayed to a multiplier cam splined to a shaft. A follower connected to the multiplier cam supplies a metering valve with an input to control the flow of fluid to the turbine. However, an altitude responsive member is connected to the shaft and provides the multiplier cam with an input in order that the fuel supplied to turbine during the starting time period is the correct fuel to air ratio for starting the turbine engine at any altitude of the aircraft. The timer mechanism which is connected to the altitude responsive member modifies the input of the altitude responsive member to the multiplier cam for a time period equal to the time required for the compressor to reach idle speed. In addition, a signal cam located on the shaft responds to the timer mechanism to control the operation of the bleed valve and variable geometry in order to start the turbine. When idle speed is reached, the timer mechanism is inactivated and the fuel flow through the metering valve is supplied to the turbine as a function of the temperature of the air supplied to the compressor and the static pressure of the surrounding environment corresponding to a requested input on the power lever by the operator.

It is an object of this invention to provide a fuel control for a turbine engine having a starter mechanism for controlling the scheduling of fuel to engine as a function of time.

It is another object of this invention to provide a fuel control for a turbine engine with a timer mechanism which modifies the operational input of an altitude responsive member to a metering valve during a starting sequence of the turbine engine to assure that the fuel supplied to turbine engine during the starting sequence matches the optimum starting performance of the turbine for the existing atmospheric pressure and temperature.

It is a further object of this invention to provide a turbine engine with a timer mechanism to modify the input of a scheduling cam through movement of a pressure responsive cam and thereby supply a metering valve with an operational input to a metering valve. The operational input to the metering valve assures the proper fuel flow to the turbine when the power lever is moved from a cut-off position to the start position. In addition, when the timer mechanism is actuated by movement of the power lever to the cut-off position, a bleed valve and geometry control vanes on the turbine engine move to a start position and thereby provide optimum starting conditions for the turbine engine.

These and other objects should be apparent from reading this specification and viewing the drawings.

BRIEF DESCRIPTION OF THE DRAWINGS

FIG. 3 is a sectional view of the components of the fuel control of FIG. 1 with the power lever in the start position for the turbine engine.

DETAILED DESCRIPTION OF THE INVENTION

Figure 1:
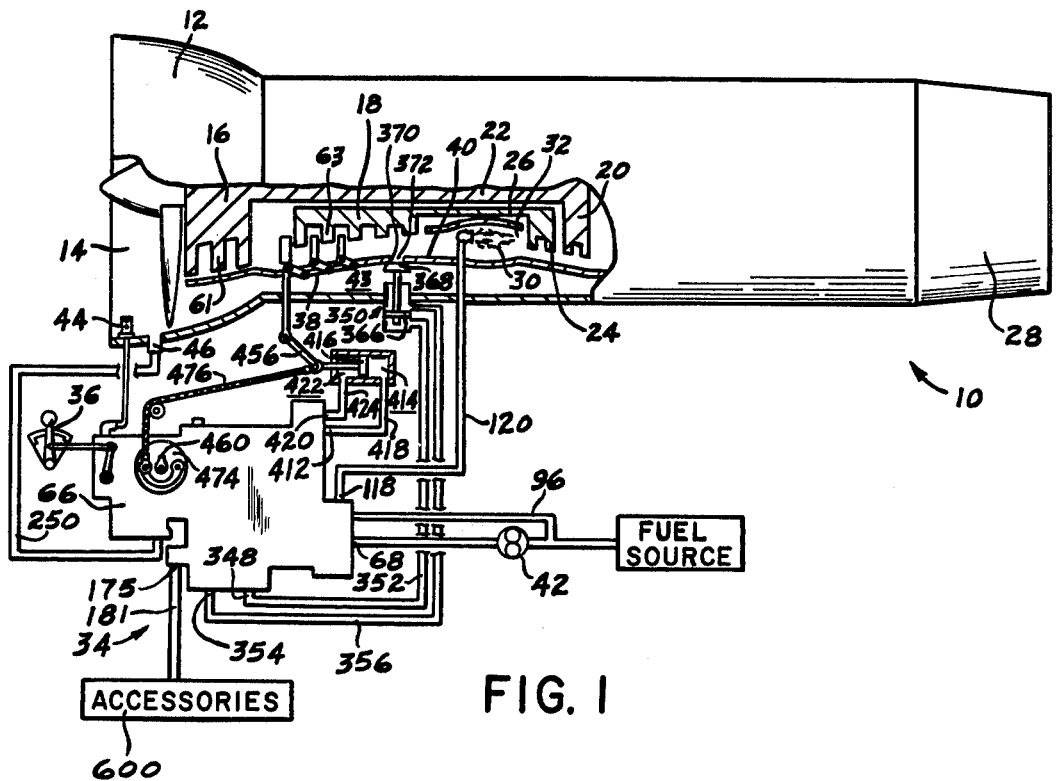
FIG. 1 is a schematic illustration of a turbine engine equipped with a fuel control made according to the principles of this invention.

The turbine engine 10 for use in an aircraft as shown in FIG. 1 has a housing 12 with an air inlet 14, a first stage air compressor 16, a second stage air compressor 18, a first turbine 20 connected by shaft 22 to the first stage compressor 16, a second turbine 24 connected by shaft 26 to the second stage compressor 18 and an exhaust nozzle 28. A plurality of fuel nozzles 30 which are located in a combustion chamber 32 receive fuel from a fuel control mechanism 34 in response to an operator input to a power lever 36. The fuel in chamber 32 and the air supplied thereto by the first and second stage air compressors are combined in a fuel-air mixture and burned to generate a thrust as the products of combustion pass through exhaust nozzle 28.

The volume of air which is communicated to combustion chamber 32 is determined by the position of vanes 38 with respect to second stage compressor 18 to create a variable geometry flow path between shroud 40 and the second stage compressor 18 with any excess air being communicated to the rear of housing 12 through flow ducts 43.

The fuel supplied to nozzle 30 is metered flow from a positive displacement pump 42 that is driven by the output of the turbine 20 in a manner well known in the field of turbine engines.

The fuel to air ratio determines the temperature of the hot gases entering the turbine from combustion chamber 32. If the fuel flow through nozzles 30 is increased, the temperature of the air passing through combustion chamber 32 is proportionally increased to supply added thermal and pneumatic energy to rotate turbines 20 and 24 while at the same time increasing the thrust of the exhausted gases through nozzle 28.

In order to obtain optimum thermal efficiency and maximum thrust, the turbine inlet temperature is maintained as close to the allowable limits as possible. Thus, a temperature probe 44 is located in inlet 14 to monitor the temperature of the air that is supplied to the first and second stage compressors 16 and 18. The output of the temperature probe 44 is connected to a first compensator mechanism 50, of the type illustrated in U.S. Pat. No. 3,393,606, in the fuel control 34 to modify the amount of fuel supplied to the combustion chamber 32.

The first compensator mechanism 50 has a cam 52, the surface of which corresponds to various inlet temperatures and operating fuel flow requirements. A lever arm 58 connected to the temperature responsive first compensator mechanism 50 moves cam 52 with respect to shaft 54. A feedback probe 56 connected to the cam 52 assures that the position of the cam 52 with respect to the shaft 54 matches the temperature measured by the probe 44. Thus, the operation of the turbine within safe temperature limits is assured.

To increase or accelerate the turbine speed or engine thrust, it is necessary to provide excess fuel flow above the amount required to run the engine at a fixed speed. However, because of the maneuver requirement of many aircraft, it is necessary that the speed increases as quickly as possible in response to the pilot's request. However, the rate at which the engine speed can safely be increased is limited by the following engine operational factors: (a) the maximum allowable turbine inlet temperature; and (b) compressor stall.

The maximum inlet temperature is limited by the first compensator member 50. However, compressor stall is a condition that is caused by several factors. One of these factors occurs when the compressor speed is accelerated too rapidly. As the speed of the compressor is increased, the weight flow of air through the first and second compressors 16 and 18 must also increase. However, there is a limit to the rate at which the airflow can be increased. The compressors 16 and 18 pump air by means of several blades 61 and 63 which are dependent on a smnooth aerodynamic airflow around each blade in order to function properly. If the rotational speed of the compressor is accelerated faster than the airflow can accelerate, the smooth airflow is interrupted and turbulence occurs. This turbulence thereafter reduces the airflow to the combustion chamber 32 resulting in too great a volume of fuel in the combustion chamber. However, the cam 52 of temperature compensator member 50 normally compensates for this type of airflow to limit the rate at which the fuel flow can be increased to the combustion chamber. Unfortunately, when an aircraft equipped with a turbine engine 10 is used on a military aircraft such as a combat fighter plane during an engagement wherein rockets and other arms are fired, exhaust gases of the rocket are sucked into the engine air intake 14. These exhaust gases are depleted of oxygen and when presented to the combustion chamber 32 the effect is the same as reducing the airflow to the engine. However, the air pressure sensed by static tube 46 does not change and the temperature of the gases passing through the inlet 14 occurs too rapidly for the sensor 44 to provide temperature responsive member 50 with an input. If compensation is not made for the intake of the rocket exhaust gases, the turbine engine will overheat and a stall will occur.

When such an unscheduled shutdown occurs with the aircraft in the air, the engine must be restarted in order to avoid a possible crash. In order to restart the turbine engine while the aircraft is airborne, the pilot must follow the same procedure as when the aircraft turbine engine is started on the ground. However, the time involved in bringing the turbine up to idle speed must be adjusted for altitude. This adjustment is achieved through the starting timer mechanism 60 which modifies the input of the second compensator or altitude responsive members 62 to the metering valve 64 in the fuel control 34 to properly schedule fuel to the turbine 10 to restart the engine.

Figure 2:
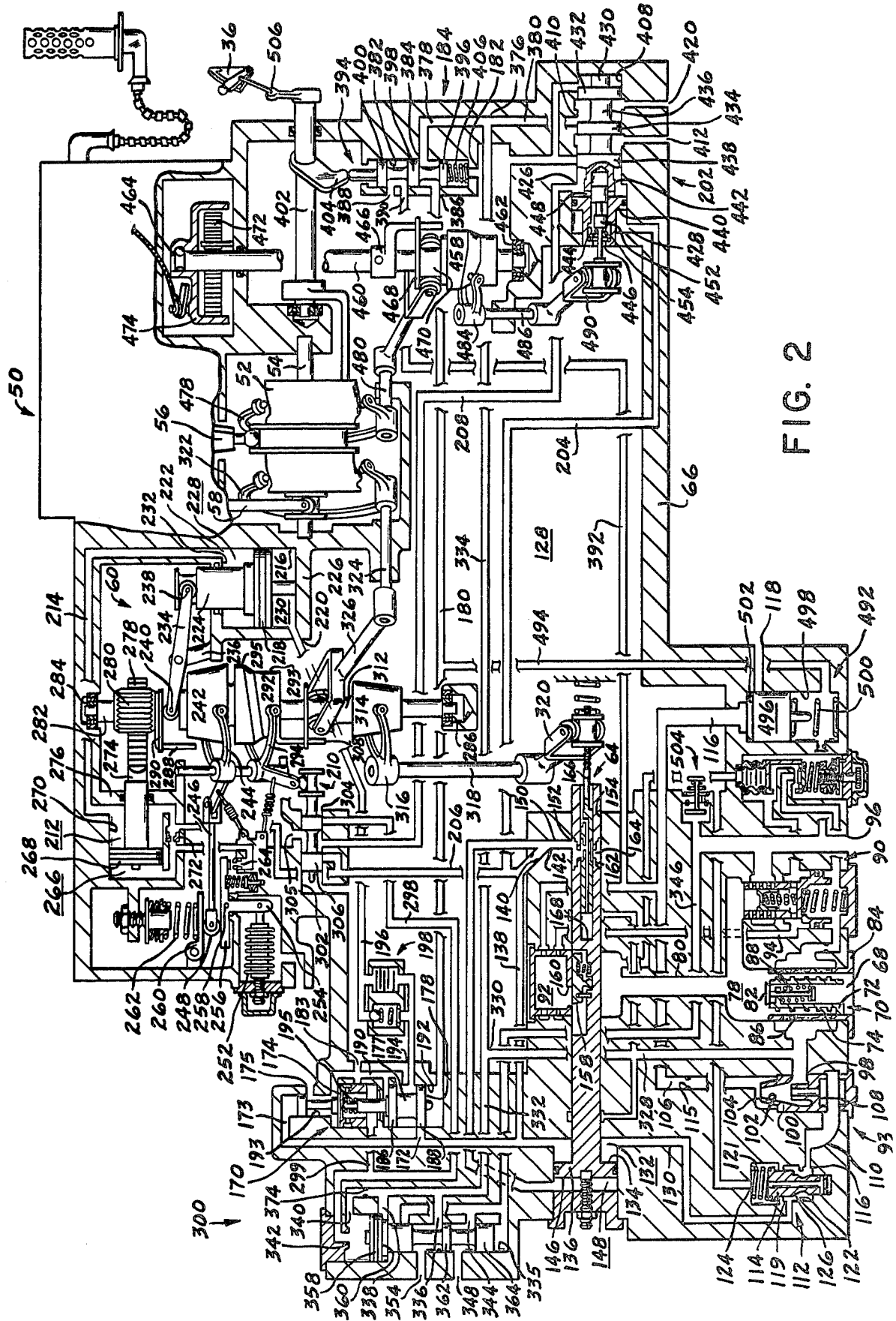
FIG. 2 is a sectional view of the fuel control of FIG. 1 showing the components thereof with the power lever in a fuel cut off position.

In more particular detail, the fuel control 34, as shown in FIG. 2, has a housing 66 with an inlet port 68 connected to the positive displacement pump 42 through which fuel is carried to an inlet wash filter 70.

The wash filter 70 has a sleeve 72 located in a cylindrical body 84. A screen 86 is located in the cylindrical body 84. Fuel from pump 42 flows between the sleeve 72 and the cylindrical body 84 into chamber 78 connected by conduit 80 to the metering valve 64. A portion of the fuel passes through screen 86 to establish an operational fluid for providing the power to operate the fuel control 34. A series of projections 74 which extends from the sleeve 72 create a turbulence in the fluid flowing to chamber 78 to remove any material from the screen 86.

In addition, when the flow of fuel from pump 42 reaches a predetermined value, spring 88 associated with valve 82 is overcome and fuel also flows through the sleeve 72. Thus, this resiliently controlled valve 82 assures that a minimum wash velocity is always present to remove particles from screen 86.

The operational fluid on passing through screen 86 is simultaneously communicated to an integrating and proportional flow control 90 of the type clearly disclosed and claimed in U.S. Pat. No. 3,106,934 and to a vortex filter 93.

The integrating and proportional flow control 90 is connected to the outlet chamber 92 of the metering valve 64 by conduit 94 and to a bypass conduit 96. Bypass conduit 96 returns fuel from chamber 78 when pump 42 supplies more fuel than is required to operate the turbine 10.

The operational fluid, which enters port 98 of the vortex filter 93 at the bottom of cone 100, spins around causing any contaminates that remain in the operational fluid after passing through filter 86 to be thrown toward surface 102 through centrifugal force and be carried through opening 104 to conduit 106. A restrictor 115 in conduit 106 limits the rate at which the fuel flows from the opening to the main fuel supply conduit 116 that is connected to nozzles 30 in combustion chamber 32 through port 118 and conduit 120.

At the same time, clean operational fluid passes through opening 108 at the center of the base in cone 100 for distribution to servo regulator valve 112 through conduit 110.

The servo regulator valve 112 has a plunger 114 with a land 126 thereon that separates an entrance port 116 from an exit port 118. A spring 121 acts on plunger 114 to urge land 126 toward a seat 122 on the housing. A control port 124 connects one side of the plunger to an exhaust reservoir 128. When the pressure of the clean operational fluid in conduit 110 acts on land 126, the plunger 114 moves after the force of spring 121 is overcome to allow the operational fluid to flow past seat 122 through exit port 118 into conduit 130 for distribution to the other components in the fuel control 34.

The clean operational fluid in conduit 130 is communicated to chamber 132 in the metering valve 64 and acts on face 134 of piston 136 before passing through restriction 140 in conduit 138 for distribution to junction 142.

A first branch of junction 142 is connected to conduit 144 which communicates the clean operational fluid to chamber 148 in the metering valve 64. The clean operational fluid in chamber 148 acts on face 146 of piston 136 to develop a pressure differential force across piston 136.

A second branch of junction 142 is connected by passage 150 to a control port 152 in bore 154 that retains stem 156 of the metering valve 64.

The metering valve 64 has a flat plate 158 that cvontrols the flow of fuel from supply conduit 78 through a triangular shaped port 160 into chamber 92 in response to an input to stem 156. The clean operational fluid supplied to control port 152 passes through opening 164 in groove 162 into a control groove in slide valve 166. A radial passage in the slide valve 166 connects an axial passage to the control groove to allow the clean operational fluid to flow into the exhaust reservoir 128 after acting on surface 168 to develop a force to oppose the forces on piston 136. By moving the slide 166, the flow of clean operational fluid through opening 164 is changed and correpondingly the fuel flow through opening 160 is changed as the stem 156 is moved by a change in the pressure differential across piston 136. The movement of the slide valve 166 is controlled by a change in the operational fuel requirement as determined by either the altitude pressure responsive member 62, the temperature responsive member 50, or the input to the power lever 36.

Conduit 130 is simultaneously communicated to port 172 in stepped bore 192 and port 173 in bore 193 of the fuel management valve 170. The fuel management valve 170 has a plunger system consisting of a first cylindrical member 174 which is located in bore 193 and a second cylindrical member 177 which is located in bore 192.

The first cylindrical member 174 has a first land that separates port 173 from port 175 through which conduit 181 communicates fluid to the accessories 600, such as the exhaust nozzle control, air inlet vane control, etc., and the exhaust port 183 and a second land with a blind axial bore therein. A first and second radial passage extend through the wall of the first cylindrical member to provide communication between the blind axial bore 193.

The second cylindrical member 177 has a first land 186 and a second land 188 that controls communication of the operational fluid from port 172 into conduit 196 through port 194 for distribution to the timer mechanism 60 and controls communication between port 194 and passage 190 to provide a flow path for exhaust chamber 230 to reservoir 128 through port 183. The second cylindrical member has a first end that extends through a bearing wall that separates the first bore 192 from the second bore 193 into the blind bore of the first cylindrical member 174. A spring, located in the blind bore, acts on the first and second cylindrical members and in conjunction with the forces produced by the operational fluid acting on the end orifice 176 of the first cylindrical member 174 and on end or face 178 of the second cylindrical member 177 exposed to fluid in conduit 180 positions the plunger system and controls the flow fo the operational fluid to conduits 181 and 196.

Flow of the operational fluid in conduit 196 is controlled by a restrictor device 198. The restrictor device 198 includes a baffle and check valve. The operational fluid flows through the baffle portion toward the timer mechanism 60. However, when the flow of the fluid is reversed, the flow is through the check valve because it offers less resistance.

A second junction 200 in conduit 138 is first connected to a variable vane control valve 202 by conduit 204, and secondly connected to the variable vane control valve 202 through cvonduits 206 and 208 by way of signal valve 210 and to the timer mechanism 60 through control chamber 212 associated with the altitude responsive member 62 by way of conduits 206 and 214.

The timer mechanism 60 has a bore 216 in which piston 218 is located to separate port 220 from port 222. A stem 224 attached to piston 218 extends through housing 226 to reduce the effect area of the piston in chamber 228. When the fluid pressure of the operational fluid in chambers 228 and 230 are equal, the force created across piston 218 moves the piston 218 until stop 232 engages housing 226.

A lever 234 which is pivotally attached to projection 236 that extends from housing 226, has a first end 238 connected to stem 224 and a second end 240 connected to cam 242 of the pressure responsive mechanism 62.

The pressure responsive mechanism 62 which is of the type disclosed in U.S. Pat. No. 3,232,179, includes a three-dimensional cam 242 and a follower 244 connected thereto. A push rod 246 is attached to the follower 244 to provide a roller 248 with an input force. The input force is balanced by the pressure force produced by the effect of the atmospheric pressure supplied by conduit 250 from static tube connection 46 located in the inlet of the turbine housing 12.

The pressure force is generated in aneroid 252, which either expands or contracts, in response to changes in atmospheric pressure caused by changed in altitude. This pressure force is transmitted through arm 254 attached to beam 256. Beam 256 is pivotally attached to the housing by pin 258 to establish a fulcrum around which the beam 256 pivots in response to the forces of the aneroid and the movement of roller 248 between the first beam 256 and a second beam 260. Beam 260 has a first end pivotally attached to the housing and a second end which pivots around this first end. A spring 262 located between the housing and the second beam 260 acts on the roller 248 through the second beam to balance the force of the aneroid 252.

The first beam 256 has a first end which is located over a relief port 264 connected to chamber 266 to restrict the flow of the operational fluid from chamber 266 into exhaust reservoir 128.

A piston 268 is located in bore 270 to separate chamber 212 from chamber 266. A passage with a restriction 272 connects chamber 212 with chamber 266 and allows a controlled flow of the operational fluid from conduit 206 to the relief port 264. A stem 274 which is attached to piston 268 extends through the housing 276 and reduces the effective area of piston 268 in chamber 212 as compared to the effective area of piston 268 in chamber 266. The force created by the operational fluid in chamber 266 acting on the area of the piston 268 therein provides a force which is transmitted through stem 274 into rack 278.

The output force of rack 278 is transmited into gear 280 which is attached to shaft 282 located between bearings 284 and 286 fixed to the housing.

Gear 280 has a dog 228 which extends through a hole in projection 290 that extends from the three-dimensional altitude cam 242. When the feedback force exerted through push rod 246 to roller 248 and the altitude responsive force from aneroid 252 and the variable force from spring 262 are balanced, which only occurs at a single position fo the roller 258 on beams 256 and 260, piston 268 is stationary and gear 280 holds cam 242 in a fixed position corresponding to the altitude measured by the aneroid.

A single cam 292 located on shaft 282 is connected to altitude cam 242. A follower 294 is connected to the signle cam 292 to provide spool 306 of signal valve 210 with an operational input to control the flow of operational fluid from bleed control valve 300 to the exhaust reservoir 128 by way of passage 298, bore 302 and exit port 304.

The signal cam 292 has a dog 308 which extends through a hole in projection 310 extending from collar 312 on a multiplier cam 314. Multiplier cam 314 is a three-dimensional cam which is rotated as a function of the rotation of gear 280 by the change in pressure forces from aneroid 252. The rotation of cam 314 by gear 280 is nonlinear to provide a greater amount of rotation at low astmospheric pressures than at high atmospheric pressure in order to provide greater accuracy for the fuel to air ratio at lower pressure.

The rotation fo multiplier cam 314 is carried by follower 316 into shaft 318 for providing arm 320 with arcuate motion for moving push rod 166 on the slide valve associated with the metering valve 64.

A follower 322 connected to scheduling cam 52 provides shaft 324 with a rotational input which is transmitted through yoke 326 to provide the multiplier cam 314 with translatory motion to change the input to follower 316 corresponding to the requested power from power lever 36.

The operational fluid that flows through screen 86 simultaneously flows to the vortex filter 92 and through conduit 328 to junction 330 for distribution to the bleed valve control 300, the pilot valve 184 and the variable vane control valve 202 through conduits 332 and 334, respectively.

Bleed valve control 300 has a housing with a bore 335 therein with first, second, and third ports 336, 338 and 340 connected to conduit 332, a first exhaust port 342 connected to conduit 298, a second exhaust port 344 connected to bypass conduit 96 by conduit 346, and a first and second operational ports 348 and 354 connected to bleed valve 350 by conduit 352 and 356, respectively.

A spool valve 358 located in bore 335 has first land 360 that separates port 338 from exhaust port 342, a second land 362 separates port 336 from port 354, a third land 364 separates exhaust port 344 from operational chamber 348. The operational fluid in conduit 332 flows through port 336 through groove between lands 362 and 364 to act on piston 366 in bleed valve 350 and hold face 368 against seat 370 to prevent the flow of compressed air through opening 372 to duct 43. A restriction 374 in conduit 332 controls the flow of the operational fluid into bore 335 through port 340 for distribution to the exhaust reservoir 128 through conduit 298. The pressure drop across restriction 374 allows the operational fluid to act on land 360 and hold the spool valve 358 in a position as shown in FIG. 3, which indicates an operational idle condition of the turbine engine.

The operational fluid in conduit 334 is communicated to a junction 376 for simultaneous communication to pilot valve 184 by conduit 378 and to variable vane control valve 202 by conduit 380.

The pilot valve 184 has a housing with a bore 382 located therein. Bore 382 has a first port 384 connected to conduit 378, a second port 386 connected to conduit 180 going to the fuel management valve 170, first and second exhaust ports 182 and 388 connected to the exhaust reservoir, and a bypass port 390 connected to conduit 392 associated with the main fuel supply conduit 116. A spool valve 394 which has lands 396, 398, and 400 thereon is connected to shaft 402 through arm 404. A spring 406 in bore 382 urges the spool valve 394 toward a stop to prevent the operational fluid to be communicated through port 384 when the turbine is operating and allow conduit 180 to be communicated to exhaust reservoir 128.

The variable vane control valve 202 has a housing with a bore 408 located therein. Bore 408 has a port 410 through which conduit 380 is connected to bore 408, a port 412 connected to chamber 414 of vane piston 416 by conduit 418, a port 420 connected to chamber 422 of vane piston 416 by conduit 424, a port 426 connected to signal valve 210 by conduit 208, and a port 428 connected to the supply of clean operational fluid in conduit 204. A spool valve 430 located in stepped bore 408 has a first land 432 separated from a second land 434 by a first groove 436 and a third land 438 separated from a fourth land 440 by a second groove 442. The spool valve 430 has a blind bore 444 which is connected to the exhaust reservoir 128 by opening 446. A radial passage 448 in the spool valve 430 connects the second groove 442 with blind bore 444. A push rod 450 positions a slide valve 452 in blind bore 444 with respect to radial passage 448 to provide a controlled flow of the clean operational fluid from conduit 208 to the exhaust reservoir 128 by way of port 426, stepped bore 408, radial passage 448, blind bore 444 and opening 446 and with spring 454 balances the force created by the operational fluid in bore 408 from port 428 acting across land 440 to hold the spool valve 430 in a stationary position. The position of the slide or pilot valve 450 is controlled by an input from the power lever 36 through the scheduling cam 52 and a feedback from linkage 456 that positions the vanes 38 in the turbine engine 10 as modified by a cam 458.

The cam 458 is located on a shaft 460 which has a first end 462 journaled in housing 66 and a second end 464 that extends through the housing 66. A dog 466 which extends through an opening in projection 468 of collar 470 attached to cam 458 connects cam 458 to shaft 460. A return spring 472 has a first end attached to the housing 66 and a second end attached to drum 474 connected to shaft 460. A cable 476 attached to linkage 456 provides shaft 460 with a rotational torque corresponding to the position of the vanes 38 in opposition to spring 472 which attempts to return shaft 460 to a null position.

A follow 478 connected to scheduling cam 52 provides shaft 480 with a rotational input corresponding to the fuel required to meet a power input as modified by temperature. A lever 482 attached to shaft 480 and collar 470 moves cam 458 on shaft 460 with respect to dog 466 to provide a temperature compensated input to the cam 458.

A follower 484 which is connected to cam 458 provides shaft 486 with a rotational torque corresponding to the position of cam 458 with respect to shaft 460 and the rotation of shaft 460 by the input from the feedback of the vanes 38. A lever 490 has a first end connected to shaft 486 and a second end connected to push rod 450 to provide the pilot or slide valve 452 with an input corresponding to the torque received by shaft 486 to position the spool valve 430 at a position to control the flow of the operational fluid to piston 466 which operates vanes 38 to change the geometry of the flow path for the air through compressor vanes 63.

The pilot valve 184 which is responsive to movement of the power lever 36 is connected to a fuel cut-off valve 492 by a conduit 494 attached to conduit 180.

The cut-off valve 492 has a piston 496 which is located in bore 498 of the fuel supply conduit 116. The pressure of flow of metered fuel in supply conduit 116 acts on piston 496 to overcome spring 500 and hold face 502 away from pore 118 and allow unrestricted communication from the metering valve 64 to nozzle 30 in combustion chamber 32.

When the power lever 36 is moved to the cut-off position and the operational fluid is supplied to conduit 180, the pressure of the operational fluid acts on piston 496 to move face 502 past port 118 and interrupt the flow of fuel to the combustion chamber 32. Simultaneous with the communication of the operational fluid to conduit 180, land 298 moves away from port 390 to open port 388 to relief conduit 392. Thus metered fuel in conduit 116 thereafter flows through conduit 392 into the exhaust reservoir 128.

The fuel in the exhaust reservoir 128 flows through a check valve 504 into return conduit 96 for distribution to either the fuel source or into pump 42 for presentation to port 68 of the fuel control 34 to maintain a fuel flow through the metering valve 64 in order that the fuel required for the fuel to air ratio is immediately available should the operator require needed power from the turbine.

MODE OF OPERATION OF THE INVENTION

When the turbine engine 10 is started with the aircraft on the ground or restarted in flight after an unscheduled shutdown, the power lever 36 is moved to the cut-off position shown in FIG. 2 to indicate the starting sequence of this invention.

When power lever 36 is moved to the cut-off position, linkage 506 rotates shaft 402 to move scheduling cam 52 to the idle fuel flow requirement and arm 404 engages and moves spool 394 to allow the operational fluid supplied by the pump 42 through the interconnection of conduits 328, 334, 180 and 494 to act on piston 496 to cut off the supply of fuel to nozzles 30 through conduit 120 and on face 178 of the second land 188 of cylindrical member 177 in the fuel management valve 170. The operational fluid acts on face 178 to initially move the second land 188 over port 172 to terminate flow of clean operational fluid in conduit 130 to chamber 230 in the timer mechanism 60 and thereafter move the first land 186 away from port 194 to vent chamber 230 to the exhaust reservoir 128 as the fluid pressure in chamber 228 acts on and moves piston 218 to the time starting position.

At the same time spring 195 moves the first cylindrical member 174 to initially interrupt communication of the operational fluid from port 173 to port 175 and deactivate the accessories when port 175 is opened to the reservoir 128 through port 183. As shown in FIG. 2, the blind bore of the first cylindrical member is connected to passage 298 when the radial bore is aligned with passage 299. The fluid in bore 298 thereafter acts on the first and second cylindrical members 174 and 177 to hold the first cylindrical member 174 in a fixed position until the turbine substantially reaches idle speed.

As piston 218 moves, lever 234 moves cam 242 and 292 on shaft 282 with respect to gear 280 to provide follower 244 with an input that moves roller assembly 248 which pivots beam 256 around pivot pin 258 to change the flow relationship between first end of the beam and the relief port to allow an increase in the operational fluid flow from chamber 266 into the exhaust reservoir 128. As the pressure differential across piston 268 changes, the operational fluid in chamber 212 moves the piston 268 to provide rack 278 with a torque to cause gear 280 to rotate on shaft 282. Rotation of gear 280 is transmitted into cam 242 through dog 288 and thereby change the input supplied to push rod 246 through follower 244. The input supplied to roller 248 from the follower 244 is balanced between the forces applied by beam 260 by spring 262 and arm 254 by the aneroid 252. When this balance condition occurs, cam 242 is rotated on shaft 282 to reflect the fluid pressure of the air that flows past static tube 46 to the first compressor 16.

It is generally accepted that axial compressors are designed for maximum efficiency at only one set of conditions, which is usually at or near maximum power at sea level standard conditions. When the compressor is operated at low speeds or starting, the first stages of compressor 18 pump more air than the latter or rear stages of compressor 18 can handle without creating turbulent air flow on the first stages. Therefore, at low speeds and on starting, this excess of air must be dumped to the air duct 43 to bypass the rear stages of compressor 18. This is achieved by opening bleed valve 350 to allow air to flow to the air duct 43 in the following manner.

When timer piston 218 moves cam 242 toward gear 280, cam 292 which is attached thereto also moves in the same manner. The translatory motion causes follower 294 to move onto surface 293 and provide spool 306 in signal valve 210 with a starting signal that positions a first land over the connection of conduit 206 to bore 302 to interrupt the communication of the operational fluid to bore 302, a second land over the connection of conduit 298 to bore 302 to interrupt the communication of the operational fluid to the exhaust reservoir 128 through port 304 and opens the flow communication from conduit 208 to the exhaust reservoir 128 through port 305 in bore 302.

With the flow of the operational fluid through conduit 298 interrupted, fluid pressure starts to build up in bore 335 adjacent port 340 to create a pressure differential between land 360 and land 364. This pressure differential moves the spool 358 to open communication of the operational fluid from port 336 to port 354 and provide an exhaust flow path port 348 and port 344. The operational fluid from port 354 passes through conduit 356 to act on piston 366 and hold face 368 away from seat 370 to allow air to flow to duct 43.

In addition to opening of the bleed valve 350 to divert a portion of the air from the second compressor 18, the variable vanes 38 are moved to change the geometry of the air flow path through the second compressor 18 when the signal valve 210 is operated by the movement of cam 292 by the timer piston 218 in the following manner.

Movement of the timer piston 218 to the timing position causes lever 234 to pivot on pin 235 and move the altitude responsive feedback cam 242 toward gear 280. Since the signal cam 292 is attached to cam 242, it also moves toward gear 280 to allow follower 294 to move onto surface 293 and position signal valve 306 to open communication between conduit 208 and the exhaust reservoir 128 through bore 302 and port 305. With conduit 208 connected to the exhaust reservoir 128, the operational fluid communicated to bore 408 through port 428 acts on land 440 to move the spool valve 430 and allow the operational fluid in conduit 380 to flow between ports 410 and 420 through groove 436 and provide piston 416 with an input that repositions vanes 38 to a cambered position to limit the airflow through the second compressor 18.

When the power lever 36 is moved from the cut-off position to the start or idle position as shown in FIG. 3, linkage 506 rotates shaft 402 to move scheduling cam 52 to an idle fuel flow schedule position. At the same time, arm 404 moves to allow spring 406 to move spool valve 394 to the pilot valve 184 in bore 382 to position land 398 over port 390 to interrupt the flow of fluid in the bypass conduit 392 to the exhaust reservoir 128 and allow the operational fluid in conduit 180 acting on face 178 of plunger 174 in the fuel management valve 170 and piston 496 in the cut-off valve 492 to flow into the exhaust reservoir 128 through port 386, bore 382 and port 182 in the pilot valve 184 and allow operational fuel to flow from metering valve 64 to nozzle 30 in combustion chamber 32 through conduit 120.

With face 178 exposed to the pressure of the fluid in reservoir 128, the operational fluid in the blind bore of the first cylindrical member 174 acts on the end of the second cylindrical member 177 to reposition the first and second lands 186 and 188 to initiate the timing period through the flow of the operational fluid to the timer mechanism 60. However, since the operational fluid acts on the blind bore and the end of the land of the first cylindrical member 176, the interruption of flow communication of the operational fluid to the accessories 600 continues at this time.

The scheduling cam 52 is modified through the temperature responsive member 50 in response to the temperature of the air flowing through inlet 14. This movement of the scheduling cam 52 causes follower 322 to rotate shaft 324 and move multiplier cam 314 through the yoke member 326 to provide follower 316 with an input to move the slide 166 to position metering valve 64 at a position corresponding to the fuel required to start the turbine engine 10.

Figure 4:
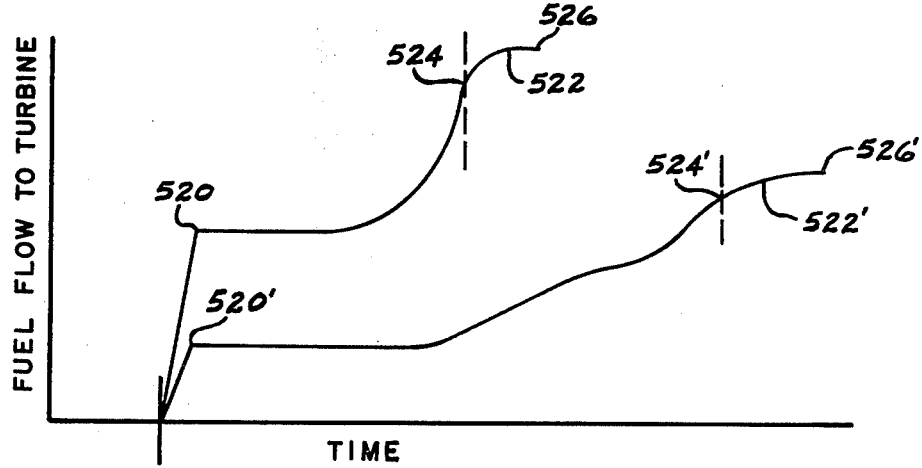
FIG. 4 is a graph showing the fuel flow required to start the turbine engine at various altitudes.

The fuel flows from the metering valve 64 through conduit 120 into the combustion chamber 32 for a time period illustrated by point 520 on starting curve 522 shown in FIG. 4 when the aircraft is at sea level and pressure of approximately 14.5 psi to fill the manifold and establish a condition for ignition. The starting curve and fill time for the turbine engine 10 for an elevation different than sea level is shown in FIG. 4 by curves 522' and point 520'.

When conduit 80 is opened to the exhaust reservoir 128, the operational fluid in conduit 298 is supplied to the blind bore of the first cylindrical member 174 through passage 299. The operational fluid acts on the end of the second cylindrical member 177 of the fuel management valve 170 to move land 188 past port 172 and land 186 to adjacent port 194 and allow the operational fluid to flow in conduit 196 to chamber 230 of the timer piston 218 to develop a force which moves piston 218 toward chamber 228. It should be noted that the flow rate in conduit 196 to chamber 230 is controlled by the restrictor 198 to establish the time period for the starting cycle.

Movement of piston 218 toward chamber 228 causes lever 234 to pivot on pin 235 and move the feedback cam 242 away from gear 280. As cam 242 moves from gear 280, follower 244 changes the position of roller 248 to provide a corresponding change in the flow of the operational fluid through relief port 264. Thereafter, the operational fluid in chamber 266 acts on piston 268 to provide rack 278 with a linear input which acts on gear 280 to rotate cam 242 through dog 288. Rotation of cam 242 is transmitted to the slide valve 166 through the inner connection of signal cam 292, dog 308, signal cam 314, follower 316, shaft 318, and arm 320 to provide the fuel flow requested for scheduling cam 52 with a modification corresponding to the altitude and the safe time for the presentation of the fuel to the combustion chamber 32.

As piston 218 approaches the end of chamber 228, follower 294 moves from surface 293 on signal cam 292 to surface 295 illustrated by point 524 in FIG. 4 for sea level elevation and 524' for an elevation different than sea level. When follower 294 moves from surface 293 to surface 295, spool 306 attached thereto moves to interrupt communication from conduit 208 to the exhaust reservoir 128 through port 305 and initiate communication of the operational fluid in conduit 206 to allow the vane control valve 202 to be positioned by the scheduling cam 52. Thereafter, the vane control valve 202 positions the variable vanes 38 through movement of piston 416.

At the same conduit 298 from bleed valve 300 is opened to the exhaust reservoir 128 through bore 302 and port 304 to allow the operational fluid in bore 335 to flow through port 342. As the operational fluid flows from port 342 a pressure build up in ore 335 acts on face 360 of land 358 to move land 362 to a position to exhaust fluid from piston 366 through conduit 356 and initiate communication of the operational fluid to piston 366 through conduit 356 to hold piston 366 against seat 372 and to interrupt flow of air through the bleed valve 350.

When the operational fluid in conduit 298 is vented to the reservoir 128, the operational fluid in the blind bore flows through the radial passage into passage 299. Thereafter, the operational fluid acts on the face adjacent the end 176 of the first cylindrical member 174 and moves the first cylindrical member 174 to terminate flow communication from ports 175 and 183 an initiate flow communication between ports 173 and 175 to thereafter supply the accessories with operational fluid.

When the timer piston 218 engages the bottom of chamber 228, illustrated by points 526 and 526' in FIG. 4 for sea level and at some flight altitude, the input of the aneroid member 252 of the altitude compensating means 62 and the position of the scheduling cam 52 by the temperature compensating means 50 control the scheduling of fuel to the combustion chaber 32 through the position of the metering valve 64. Thereafter, the power level can be changed by movement of the power lever 36 as required to operate the aircraft.

It should be noted that the time required to bring the turbine engine to idle speed varies as a function of altitude as shown in FIG. 4 for sea level and in flight altitude, by points 526 and 526' respectively. Since the timer mechanism 60 is tied to the operation of the altitude responsive compensator 62, the optimum fuel flow schedule is supplied to the combustion chamber 32 of the turbine engine 10 to start the engine irrespective of whether the turbine engine 10 is started at sea level or at any altitude thereabove.

I claim:

1. In a turbine engine having a compressor with a bleed valve device and a variable geometry apparatus responsive to an operational control member for regulating the flow rate of fuel supplied through a conduit to the turbine engine as a function of atmospheric pressure and the temperature of the air supplied to the compressor in response to an operator input, the improvement wherein starting control means schedules fuel flow to said turbine engine as a function of time, said starting control including:
   first compensating means for modifying said scheduled fuel flow in response to changes in temperature; and
   second compensating means for modifying said function of time in response to changes in altitude.

2. In a turbine engine having a compressor with a bleed valve device and a variable geometry apparatus responsive to an operational control member for regulating the flow rate of fuel supplied through a conduit to the turbine engine as a function of atmospheric pressure and the temperature of the air supplied to the compressor in response to an operator input, the improvement wherein starting control means schedules fuel flow to said turbine engine as a function of time, said starting control means including:
   compensating means for modifying said function of time in response to changes in altitude.

3. In the turbine engine, as recited in claim 1, wherein said operational control member includes:
   a power lever through which an operator transmits a request for power from the turbine engine, said power lever being moved from a cut-off position to an idle position to bring the turbine engine into operation.

4. In the turbine engine, as recited in claim 3, wherein starting control means includes:
   a pilot valve connected to said power lever and to a source of operational fluid, said pilot valve responding to movement of said power level to said cut-off position to allow said operational fluid to develop a reset start signal.

5. In the turbine engine, as recited in claim 4, further including:
   a cut-off valve connected to said conduit through which fuel is supplied to the turbine engine, said cut-off valve being responsive to said reset start signal to interrupt the flow of fuel to said turbine engine.

6. In the turbine engine, as recited in claim 5, wherein said operational control member further includes:
   a first shaft;
   a scheduling cam located on said first shaft and connected to said power lever, said scheduling cam having a surface that corresponds to a fuel to air ratio through which fuel is supplied to the turbine engine to obtain the requested power.

7. In the turbine engine, as recited in claim 6, wherein said first compensating means includes:
   a probe for measuring the temperature of the air supplied to the compressor to establish a temperature signal; and
   means responsive to said temperature signal to move said scheduling cam on said first shaft to modify the fuel to air ratio requested by the power lever position.

8. In the turbine engine, as recited in claim 7, wherein said starting control means includes:
   a first housing having a cavity therein with first and second ports connected to the operational fluid;
   a timer piston located in said cavity to define first and second chambers between said first and second ports;
   a stem extending through said first housing and fixed to said timer piston to reduce the effective area of the timer piston in said first chamber as compared to said second chamber, said operational fluid acting on the areas of the timer piston in said first and second chambers to develop a force to move said timer piston in said cavity; and
   linkage means connected to said scheduling cam, said second compensating means and said stem for moving a metering valve to an optimum fuel flow position to start the turbine engine when the power lever is moved from the cut-off position to the idle position.

9. In the turbine engine, as recited in claim 8, wherein said starting control means further includes:
   a fuel management valve connected to the operational fluid of said second port of said first housing and said pilot valve, said fuel management valve being responsive to said reset start signal to interrupt the communication of the operational fluid to said second chamber and allow the operational fluid in said first chamber to move said timer piston from an inactive position to a reset position, said second compensating means responding to the movement of said timer piston to provide said linkage with rotational movement to move said metering valve into a position corresponding to the fuel flow required to start said turbine engine.

10. In the turbine engine, as recited in claim 8, wherein said linkage means includes:
   a second shaft;
   a first cam located on said second shaft, said first cam having a surface thereon corresponding to altitude; said first cam being connected to said second compensating means; and
   a first lever secured to said first housing for connecting said stem of the timer piston to said first cam, said first lever moving said first cam in response to movement of said timer piston.

11. In the turbine engine, as recited in claim 10, wherein said second compensating means includes:
a second housing having a bore therein;
a gear fixed to said second shaft and connected to said first cam;
a power piston located in said bore to establish a power chamber and an operational chamber, said power chamber being connected to a relief port and said operational chamber being connected to said operational fluid, said power piston being connected to said gear;
a passage in said second housing for connecting said operational chamber to said power chamber;
an orifice member in said passage for restricting the flow of the operational fluid into said power chamber; and
first follower means connected to said first cam for regulating the flow of the operational fluid from said relief port as a function of the position of said first cam on said second shaft.

12. In the turbine engine, as recited in claim 11, wherein said second compensating means further includes:
altitude responsive means connected to said first follower means for modifying the flow of the operational fluid through said relief port as a function of atmospheric pressure, said movement of said timer piston moving said first cam which moves said first follower means and changes the flow of the operational fluid from said power chamber through the relief port to permit a pressure differential to act on and move the power piston to provide said gear with a rotational movement, said rotational movement being transmitted to said metering valve as time modified altitude compensation.

13. In the turbine engine, as recited in claim 12, wherein said altitude responsive means includes:
an aneroid member;
a first beam having a first end and a second end;
a pin connected to said beam for establishing a fulcrum to locate said first end adjacent said relief port, said first beam being connected to said first follower means; and
an arm extending from said first beam and connected to said aneroid member, said aneroid member acting on said arm in response to changes in pressure in the air supplied to the compressor to pivot said beam around said fulcrum and change the position of said first end with respect to said relief port to modify the flow of operational fluid from the power chamber.

14. In the turbine engine, as recited in claim 13, wherein said second compensating means further includes:
a second beam having a pivotally fixed end;
a roller located between said first and second beams and connected to said first follower means; and
a spring acting on said second beam to provide a resilient force on said roller to oppose the movement of said first beam by said aneroid member.

15. In the turbine engine, as recited in claim 14, wherein said first follower means moves said roller between said first and second beams to move said first end with respect to said relief port and thereby very the flow of the operational fluid therefrom, said operational fluid in the power chamber thereafter acting on said power piston to provide said gear with a torque to rotate said first cam and reposition said roller at a position wherein the force from said aneroid member is balanced with the force from said spring.

16. In the turbine engine, as recited in claim 15, wherein said starting control means further includes:
a second cam fixed to said first cam; and
a second follower means connected to said second cam for providing the bleed valve device and variable geometry apparatus with an operational signal for starting of the turbine engine.

17. In the turbine engine, as recited in claim 16, wherein said starting control means further includes:
a third housing having a bore therein with an entrance port connected to said operational fluid, an exit port connected to the variable geometry apparatus, a first and second exhaust port for connecting said bleed valve device and variable geometry apparatus to a reservoir; and
a spool valve located in said bore and connected to said second follower means, said movement of said second follower initially interrupting the flow of the operational fluid between said entrance port and said exit port for distribution to said variable geometry apparatus and the first exhaust port and the bleed valve device and thereafter allowing operational fluid to flow from the variable geometry apparatus to the reservoir through said second exhaust port.

18. In the turbine engine, as recited in claim 17, further including:
a third cam located on said second shaft and connected to said second cam, said rotational movement of said second shaft being communicated to said third cam;
a scheduling follower connected to said scheduling cam for providing said third cam with a fuel air ratio request modified by temperature; and
third follower means connected to said third cam and a second lever for providing said metering valve with an operational input modified by pressure and temperature.

19. In the turbine engine, as recited in claim 18, further including:
a variable geometry valve having a bore therein with first and second ports connected to said operational fluid, a third port connected to the exit port of the third housing and fourth and fifth ports connected to the variable geometry apparatus; and
a second spool valve located in bore and having a series of lands thereon to control communication of the operational fluid from said second port to one of said fourth and fifth ports and a power land for separating said first port from said third port, said power land responding to the operational fluid communicated to said bore through said first port when said third port is communicated to the reservoir to move said series of lands and allow operational fluid to flow to and position the variable geometry apparatus at a position to start the turbine engine.

20. In the turbine engine, as recited in claim 19, further including:
feedback means connected to said variable geometry apparatus for providing an indicator signal corresponding to the position of said variable geometry apparatus;
a third shaft connected to said feedback means;
a variable geometry cam splined to said third shaft; and a variable geometry follower means connected to said variable geometry cam for providing said second spool valve with an input corresponding to said indicator signal.

21. In the turbine engine, as recited in claim 20, further including:
scheduling follower means connected to said scheduling cam to provide said variable geometry cam with a modification corresponding to the temperature measured by said probe.

22. In the turbine engine, as recited in claim 21, wherein said second spool valve includes:
a passage for connecting said third port to said exhaust reservoir; and
a cylindrical member connected to said variable geometry follower means and located in said passage to restrict the flow of operational fluid through said third port to the exhaust reservoir and match the resultant force generated across said cylindrical member with the input from the variable geometry follower means.

23. In the turbine engine, as recited in claim 8, wherein said pilot valve further includes:
a bypass conduit for connecting the fuel flow from said metering valve with the exhaust reservoir when said power lever is in said cut-off position.

24. In the turbine engine, as recited in claim 23, wherein said pilot valve terminates the flow of operational fluid to said fuel management valve when said power lever is moved to said idle position, said fuel management valve thereafter moving to allow said operational fluid to flow to said second chamber and move said timer piston toward said inactive position in a time period equal to the optimum starting condition of the turbine engine for the existing atmospheric pressure and temperature.

25. In the turbine engine, as recited in claim 9, wherein:
said fuel management valve in response to said reset start signal interrupts the communication of said operational fluid to any accessories associated with said turbine.

26. In the turbine engine, as recited in claim 25, wherein:
said fuel management valve sustains said interruption of the operational fluid communication to said accessories until the turbine engine substantially reaches idle speed.

27. In the turbine engine, as recited in claim 26, wherein said fuel management valve further includes:
a second housing having a bore therein with first and second ports connected to said operational fluid, a third port connected to said second port of said second chamber retaining said timer piston, a fourth port connected to said pilot valve, a fifth port connected to the accessories, and a sixth port connected to an exhaust reservoir; and
spool valve means located in said bore having a first pressure surface connected to first port and a second pressure surface connected to said fourth port, said reset start signal acting on said second pressure surface to initially interrupt the communication of the operational fluid to the accessories through said fifth port and to the timer piston through the third port and thereafter provide a flow path between said third and fifth ports to the sixth port for exhausting any operational fluid from the accessories and the timer piston.

28. In the turbine engine, as recited in claim 27, wherein said spool valve means includes:
a first cylindrical member located in said bore having a first end and a second end, said first end forming said first pressure surface, said first cylindrical member having a blind bore that extends from said second end toward said first end, said first cylindrical member having a radial passage that connects the blind axial bore with the bore;
a second cylindrical member located in said bore having a first end that extends into said blind axial bore of the first cylindrical member and a second end, said second end forming said second pressure surface; and
a spring located between first and second cylindrical members, said reset start signal acting on said second cylindrical member and interrupt operational fluid communication from said second port to said third port of said second housing and thereafter establish a flow path between said third port and said sixth port for exhausting fluid from said second chamber to allow the timer piston to move to said reset position, said spring on movement of said second cylindrical member by the reset start signal moving said first cylindrical member to interrupt communication of the operational fluid between said first port and said fifth port and thereafter allow fluid communication between said fifth port and said sixth port to exhaust fluid from the accessories, said blind bore initially being connected to said sixth port through said radial passage and on movement of said first cylindrical member fluid communication is interrupted and thereafter connected to said operational fluid, said operational fluid in said blind axial bore acting on said first end of said second cylindrical member and the bottom of the blind axial bore to retain said first cylindrical member in a fixed position on initiation of said reset start signal.

29. In the turbine engine, as recited in claim 28, wherein:
said operational fluid communicated to said blind axial bore terminates when the turbine engine reaches idle operation and thereafter allow said operational fluid from said first port to act on said first pressure surface and reposition said first cylindrical member to permit operational fluid communication through said fifth port to the accessories and the blind axial bore to be exhausted through the radial passage and sixth port.

30. In the turbine engine, as recited in claim 2, wherein said operational control member includes:
a power lever through which an operator transmits a request for power from the turbine engine, said power lever being moved from a cut-off position to an idle position to bring the turbine engine into operation.

31. In the turbine engine, as recited in claim 2, wherein starting control means includes:
a pilot valve connected to said power lever and to a source of operational fluid, said pilot valve responding to movement of said power lever to said cut-off position to allow said operational fluid to develop a reset start signal.

32. In the turbine engine, as recited in claim 2, wherein said operational control member further includes:
a first shaft;

a scheduling cam located on said first shaft and connected to said power lever, said scheduling cam having a surface that corresponds to a fuel to air ratio through which fuel is supplied to the turbine engine to obtain the requested power.

33. In the turbine engine, as recited in claim 32, wherein said starting control means includes:
a first housing having a cavity therein with first and second ports connected to the operational fluid;
a timer piston located in said cavity to define first and second chambers between said first and second ports;
a stem extending through said first housing and fixed to said timer piston to reduce the effective area of the timer piston in said first chamber as compared to said second chamber, said operational fluid acting on the areas of the timer piston in said first and second chambers to develop a force to move said timer piston in said cavity; and
linkage means connected to said scheduling cam, said compensating means and said stem for moving a metering valve to an optimum fuel flow position to start the turbine engine when the power lever is moved from the cut-off position to the idle position.

34. In the turbine engine, as recited in claim 33, wherein said starting control means further includes:
a fuel management valve connected to the operational fluid of said second port of said first housing and said pilot valve, said fuel management valve being responsive to said reset start signal to interrupt the communication of the operational fluid to said second chamber and allow the operational fluid in said first chamber to move said timer piston from an inactive position to a reset position, said compensating means responding to the movement of said timer piston to provide said linkage with rotational movement to move said metering valve into a position corresponding to the fuel flow required to start said turbine engine.

35. In the turbine engine, as recited in claim 33, wherein said linkage means includes:
a second shaft;
a first cam located on said second shaft, said first cam having a surface thereon corresponding to altitude, said first cam being connected to said compensating means; and
a first lever secured to said first housing for connecting said stem of the timer piston to said first cam, said first lever moving said first cam in response to movement of said timer piston.

36. In the turbine engine, as recited in claim 35, wherein said second compensating means includes:
a second housing having a bore therein;
a power piston located in said bore to define a power chamber and an operational chamber in said second housing, said operational chamber being connected to said operational fluid and said power chamber, and power chamber being connected to a relief chamber, said power piston being connected to said second shaft;
a restriction member for regulating the flow of operational fluid from the operational chamber to the power chamber; and
follower means connected to said first cam for regulating the flow of the operational fluid from said relief port as a function of the position of said first cam on said second shaft.

37. In the turbine engine, as recited in claim 36, wherein said compensating means further includes:
altitude responsive means connected to said linkage means for modifying the flow of the operational fluid from said power chamber to said relief chamber as a function of atmospheric pressure to permit a pressure differential to develop and act on said power piston for moving said second shaft to a position whereby the operational movement transmitted to said metering valve is time modified altitude compensated.

38. In the turbine engine, as recited in claim 32, wherein said starting control means includes:
temperature compensating means for modifying said scheduled fuel flow in response to changes in temperature.

39. In the turbine engine, as recited in claim 38, wherein said temperature compensating means includes:
a probe for measuring the temperature of the air supplied to the compressor to establish a temperature signal; and
means responsive to said temperature signal to move said scheduling cam on said first shaft to modify the fuel to air ratio requested by the power lever position.

40. In the turbine engine, as recited in claim 31, wherein said pilot valve further includes:
a bypass conduit for connecting the fuel flow from said metering valve with the exhaust reservoir when said power lever is in said cut-off position.

41. In the turbine engine, as recited in claim 34, wherein said pilot valve terminates the flow of operational fluid to said fuel management valve when said power lever is moved to said idle position, said fuel management valve thereafter moving to allow said operational fluid to flow to said second chamber and move said timer piston toward said inactive position in a time period equal to the optimum starting condition of the turbine engine for the existing atmospheric pressure and temperature.

42. In the turbine engine, as recited in claim 34, wherein:
said fuel management valve in response to said reset start signal interrupts the communication of said operational fluid to any accessories associated with said turbine.

43. In the turbine engine, as recited in claim 42, wherein:
said fuel management valve sustains said interruption of the operational fluid communication to said accessories until the turbine engine substantially reaches idle speed.

* * * * *